(12) United States Patent
Haase et al.

(10) Patent No.: US 11,693,185 B2
(45) Date of Patent: Jul. 4, 2023

(54) OPTICAL CONNECTOR WITH TILTED MIRROR

(71) Applicant: 3M INNOVATIVE PROPERTIES COMPANY, St. Paul, MN (US)

(72) Inventors: Michael A. Haase, St. Paul, MN (US); Bing Hao, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/851,384

(22) Filed: Jun. 28, 2022

(65) Prior Publication Data
US 2022/0357513 A1 Nov. 10, 2022

Related U.S. Application Data

(63) Continuation of application No. 15/733,491, filed as application No. PCT/IB2019/051679 on Mar. 1, 2019, now Pat. No. 11,402,584.
(Continued)

(51) Int. Cl.
*G02B 6/26* (2006.01)
*G02B 6/38* (2006.01)

(52) U.S. Cl.
CPC .......... *G02B 6/262* (2013.01); *G02B 6/3885* (2013.01)

(58) Field of Classification Search
CPC ...... G02B 6/262; G02B 6/382; G02B 6/3828; G02B 6/3838; G02B 6/3882;
(Continued)

(56) References Cited

U.S. PATENT DOCUMENTS

| 6,075,612 A | 6/2000 | Mandella |
| 6,075,913 A | 6/2000 | Cohen |

(Continued)

FOREIGN PATENT DOCUMENTS

| WO | WO 2001-02774 | 1/2001 |
| WO | WO 2003-050584 | 6/2003 |

(Continued)

OTHER PUBLICATIONS

PRIZM® Expanded Beam Ferrules and Components, US Conec, retrieved from the internet on Oct. 7, 2020], URL: <http://www.usconec.com/products/ferrules/prizm-lightturn_ferrule.html>, 7 pages.
(Continued)

*Primary Examiner* — Michael P Mooney
(74) *Attorney, Agent, or Firm* — Jonathan L. Tolstedt

(57) ABSTRACT

A light coupling unit for use in an optical connector includes a waveguide alignment member that receives and aligns at least one optical waveguide. The light coupling unit includes a light redirecting member that has an input surface configured to receive input light from the end face of the optical wave guide. A curved reflective surface of the light redirecting member receives light from the input surface propagating along an input axis and redirects the light such that the redirected light propagates along a different redirected axis. An output surface of the light redirecting member receives the redirected light and transmits the redirected light as output light propagating along an output axis and exiting the light redirecting member. A curved intersection of the curved reflective surface and a first plane formed by the input and redirected axes has a radius of curvature. The curved reflective surface has an axis of revolution disposed in the first plane. The axis of revolution forms a first angle with the redirected axis which is non-zero. The waveguide alignment member is configured such that the end face of the
(Continued)

optical wave guide is positioned at a location that is not a geometric focus of the curved reflective surface.

10 Claims, 10 Drawing Sheets

Related U.S. Application Data

(60) Provisional application No. 62/642,629, filed on Mar. 14, 2018.
(58) Field of Classification Search
CPC .. G02B 6/3885; G02B 6/4204; G02B 6/4214; G02B 6/4292
USPC .......................................................... 385/31
See application file for complete search history.

(56) References Cited

U.S. PATENT DOCUMENTS

| | | |
|---|---|---|
| 6,832,031 B2 | 12/2004 | Smaglinski |
| 2002/0051303 A1 | 5/2002 | Smaglinski |
| 2003/0142896 A1 | 7/2003 | Kikuchi |
| 2006/0215963 A1 | 9/2006 | Hamano |
| 2007/0077008 A1 | 4/2007 | Jeon |
| 2016/0313510 A1* | 10/2016 | Doi ............................ G02B 6/30 |
| 2016/0320568 A1* | 11/2016 | Haase .................. G02B 6/3829 |
| 2017/0351043 A1 | 12/2017 | Park |

FOREIGN PATENT DOCUMENTS

| | | |
|---|---|---|
| WO | WO 2010-128327 | 11/2010 |
| WO | WO 2013-048730 | 4/2013 |
| WO | WO 2013-048743 | 4/2013 |
| WO | WO 2013-180943 | 12/2013 |
| WO | WO 2014-055226 | 4/2014 |
| WO | WO 2014-055361 | 4/2014 |
| WO | WO 2015-094811 | 6/2015 |
| WO | WO 2017-066135 | 4/2017 |

OTHER PUBLICATIONS

Toroidal mirrors Tseries, Shimadzu, retrieved from the internet on Oct. 7, 2020], URL: <http://www.shimadzu.com/products/opt/off/5iqj1d0000002ws5.html>, 5 pages.
International Search Report for PCT International Application No. PCT/IB2019/051679, dated Jun. 4, 2019, 6 pages.

\* cited by examiner

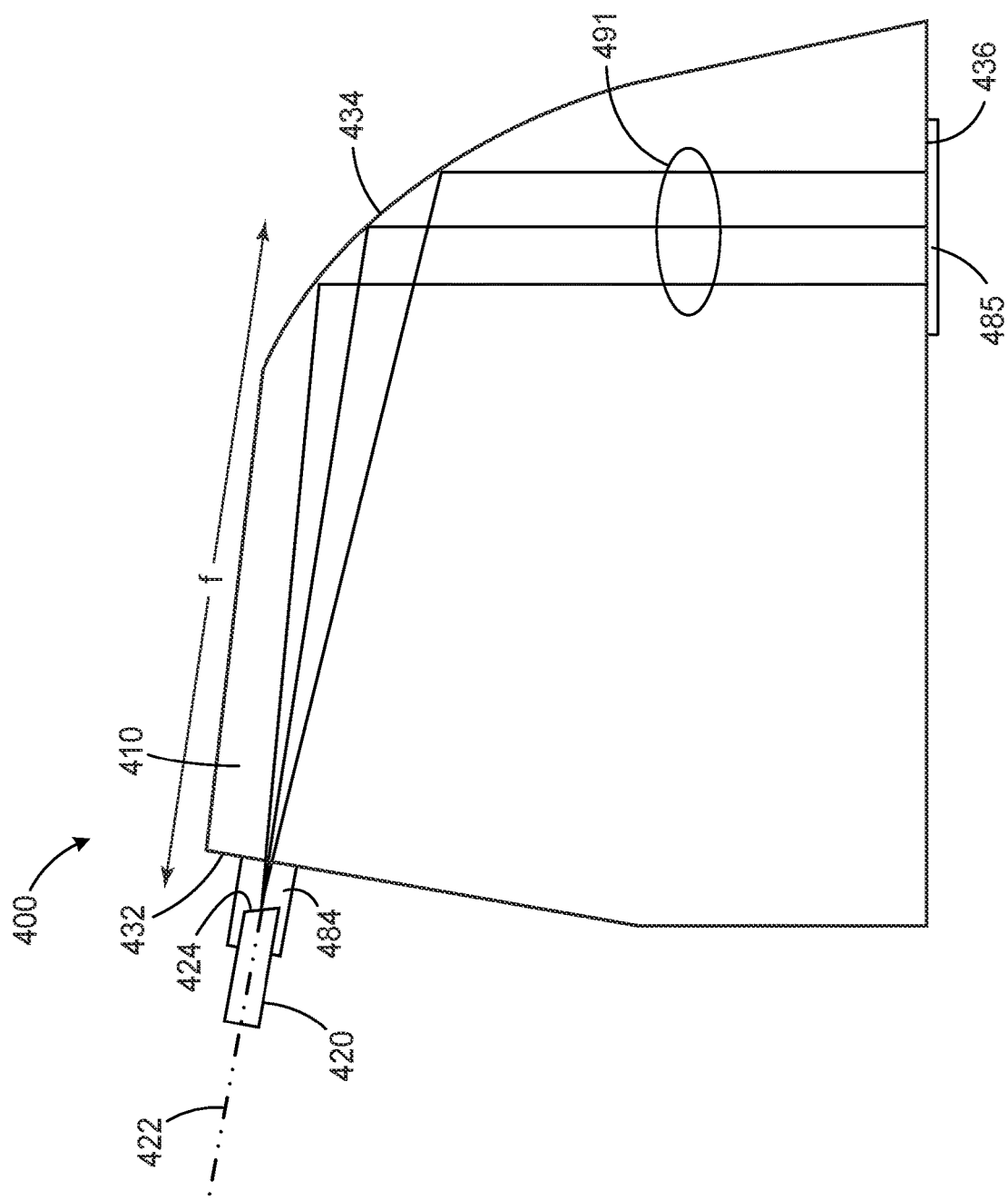

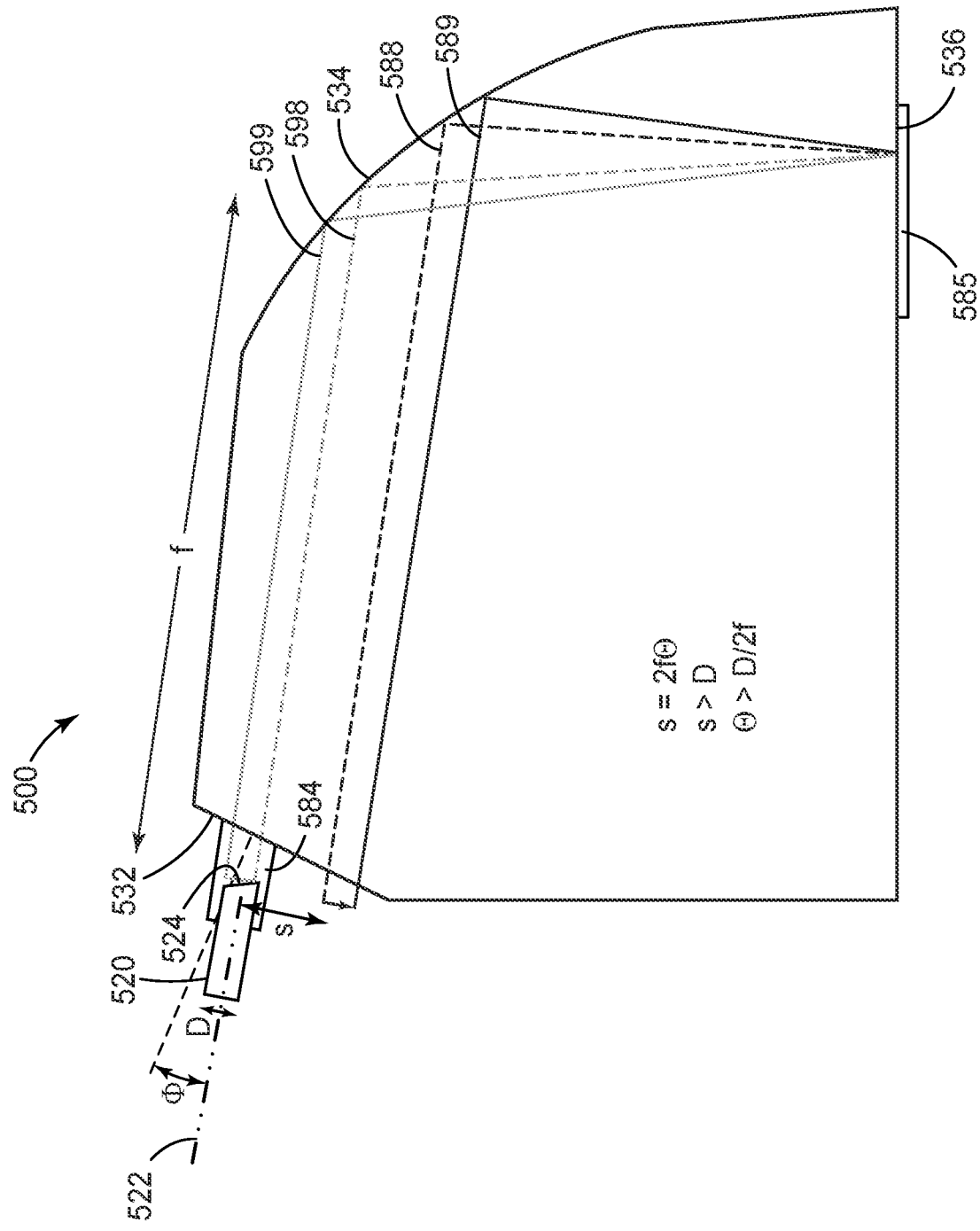

OPTICAL CONNECTOR WITH TILTED MIRROR

CROSS REFERENCE TO RELATED APPLICATION

This application is a continuation filing of U.S. application Ser. No. 15/733,491, filed Aug. 11, 2020, now allowed, which is a national stage filing under 35 C.F.R. 371 of PCT/IB2019/051679, filed Mar. 1, 2019, which claims the benefit of U.S. Provisional Application No. 62/642,629, filed Mar. 14, 2018, the disclosures of which are incorporated by reference in their entireties herein.

BACKGROUND

Optical connectors can be used for optical communications in a variety of applications including telecommunications networks, local area networks, data center links, and internal links in computer devices. Expanded optical beams may be used in connectors for these applications to provide an optical connection that is less sensitive to dust and other forms of contamination and so that alignment tolerances may be relaxed. The optical connector is generally considered an expanded beam connector if there is an expanded beam at a connection point. Generally, an expanded beam is a beam that is larger in diameter than the core of an associated optical waveguide (usually an optical fiber, e.g., a multi-mode fiber for a multi-mode communication system). The expanded beam is typically obtained by diverging a light beam from a source or optical fiber. In many cases, the diverging beam is processed by optical elements such as a lens or mirror into an expanded beam that is approximately collimated. The expanded beam is then received by focusing of the beam via another lens or mirror.

BRIEF SUMMARY

A light coupling unit for use in an optical connector includes a waveguide alignment member that receives and aligns at least one optical waveguide. The light coupling unit includes a light redirecting member that has an input surface configured to receive input light from the end face of the optical waveguide. A curved reflective surface of the light redirecting member receives light from the input surface propagating along an input axis and redirects the light such that the redirected light propagates along a different redirected axis. An output surface of the light redirecting member receives the redirected light and transmits the redirected light as output light propagating along an output axis and exiting the light redirecting member. A curved intersection of the curved reflective surface and a first plane formed by the input and redirected axes has a radius of curvature. The curved reflective surface has an axis of revolution disposed in the first plane. The axis of revolution forms a first angle with the redirected axis which is non-zero. The waveguide alignment member is configured such that the end face of the optical waveguide is positioned at a location that is not a geometric focus of the curved reflective surface.

BRIEF DESCRIPTION OF DRAWINGS

FIGS. 4A and 4B are schematic diagrams that illustrate ray-tracing of a light coupling unit;

FIGS. 5A and 5B are schematic diagrams showing ray tracing of a portion of an example light coupling unit in accordance with some embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

The disclosure generally relates to individual optical waveguides, sets of optical waveguides such as optical fiber ribbons, and optical connectors useful for connecting individual optical waveguides or multiple optical fibers such as in optical fiber ribbon cables. The optical connectors discussed herein incorporate a light coupling unit that can combine the features of optical waveguide alignment, along with redirecting and shaping of the optical beam. The optical connectors discussed in some embodiments are expanded beam connectors. In some embodiments, the light coupling unit is a unitary structure which may be a molded piece. Optical connector embodiments discussed herein may provide for reduced insertion loss, reduced optical aberrations, such as coma aberration, and/or reduced back reflection.

Figure 1:
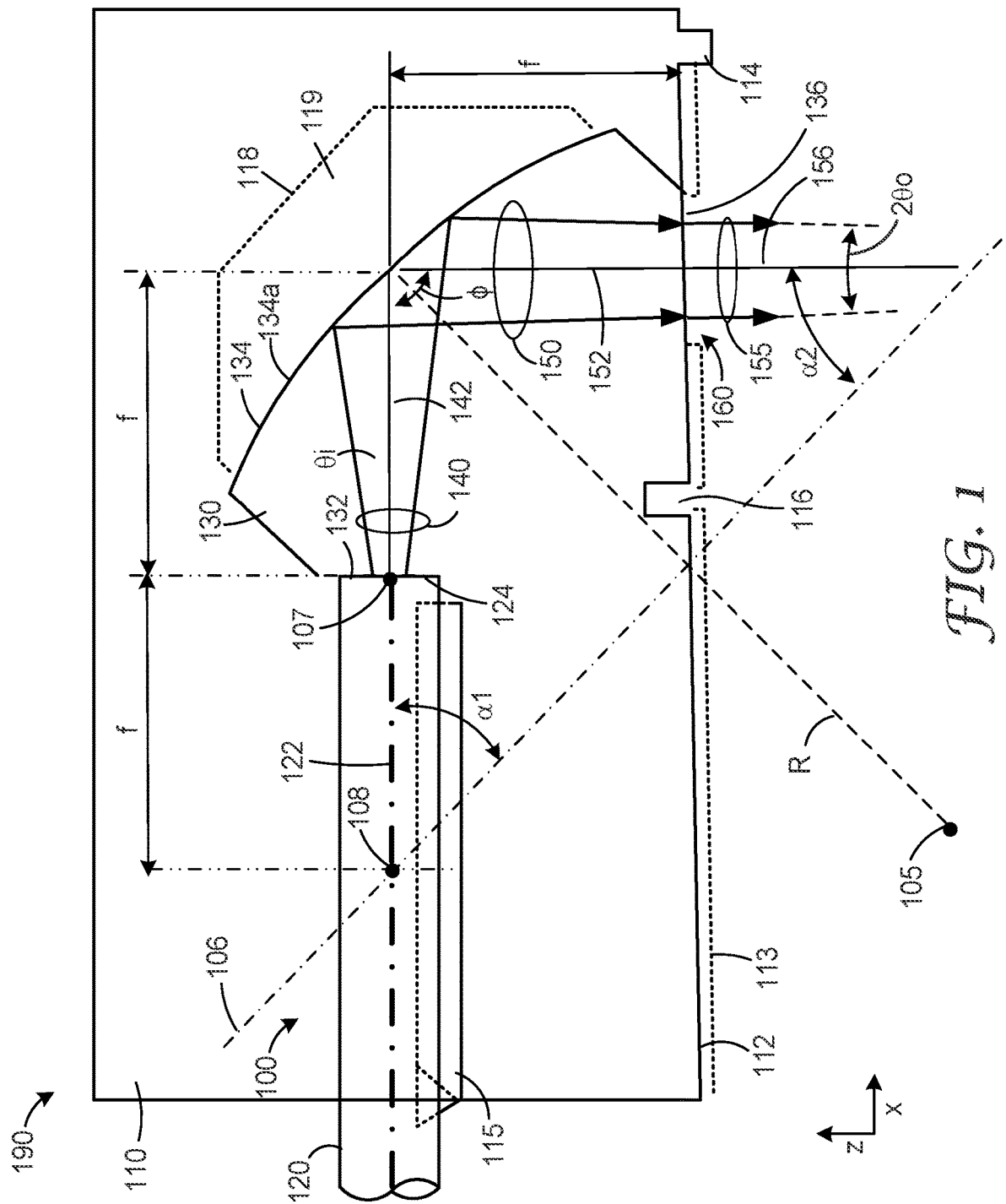
FIG. 1 shows a schematic cross-sectional view of an optical connector according to some embodiments.

FIG. 1 shows a schematic cross-sectional view of an optical connector 190 according to some embodiments. The optical connector 190 comprises at least one light coupling unit 100 disposed within a housing 110. The cross-sectional view presented in FIG. 1 is on an XZ plane of an XYZ Cartesian coordinate system, such that the XZ plane passes through a central axis 122 of an optical waveguide 120.

The optical waveguide 120 is received and aligned by a waveguide alignment member 115 of the light coupling unit 100. The optical waveguide 120 is received and aligned within the waveguide alignment member 115 such that the optical waveguide end face 124 faces an input surface 132 of a light redirecting member 130 of the light coupling unit 100. In some embodiments, the waveguide alignment member 115 is configured such that the end face 124 of the optical waveguide 120 is positioned at a location that is not the geometrical focus of the curved reflective surface 134 as discussed in more detail below. In some cases, the light redirecting member 130 can comprise a solid medium that is transparent to the wavelength of light input from the optical waveguide 120 and has an index of refraction that is greater than one. In some cases, the optical waveguide end face 124 can be immediately adjacent the input surface 132 of the light redirecting member 130; however, in some cases the optical waveguide end face 124 can be set back slightly from the input surface 132, e.g., through the use of waveguide stop features (not shown). An index matching material can be disposed between the waveguide end face 124 and the input surface 132, optically coupling the optical waveguide 120 to the input surface 132. In some cases, the light redirecting member 130 can include a reflective surface of a hollow cavity formed in the light coupling unit 110.

The optical connector 190 is configured to mate with a mating optical connector (not shown in FIG. 1) along a mating direction. According to some aspects, the mating direction is not parallel with the central axis 122. To readily accomplish the mating, the connector housing 110 further includes a mating surface 112 and alignment features 114, 116. The alignment features 114, 116, align the output surface 136 of the light redirecting member 130 within the optical connector, to one of either a second light coupling unit in a second optical connector (not shown), or a transceiver such as an optical detector or emitter, such as a vertical cavity surface emitting laser (VCSEL). In one particular embodiment, an optional recessed mating surface 113 can be formed such that a pocket 160 can be formed proximate the output surface 136, so that an air gap can be formed between the output surface 136 and the adjacent second optical connector or transceiver. In one particular embodiment, the unitary light coupling unit 100 can be a hermaphroditic coupling unit, such that the first 100 and a second unitary light coupling unit (not shown), can be identical and attached to each other, as described elsewhere. In one particular embodiment, at least one of the input surface 132 and the output surface 136 can include an antireflective coating, and/or can be proximate an index matching material.

The waveguide alignment member 115 can comprise a groove extending along a groove direction for receiving and aligning the optical waveguide 120, as described, for example, in PCT Publication Nos. WO2013/048730 entitled OPTICAL CONNECTOR HAVING A PLURALITY OF OPTICAL FIBRES WITH STAGGERED CLEAVED ENDS COUPLED TO ASSOCIATED MICROLENSES; WO2013/048743 entitled OPTICAL SUBSTRATE HAVING A PLURALITY OF STAGGERED LIGHT REDIRECTING FEATURES ON A MAJOR SURFACE THEREOF; and in U.S. patent application Ser. Nos. 61/652,478 entitled OPTICAL INTERCONNECT, and 61/710,083 entitled OPTICAL CONNECTOR, which are incorporated herein by reference. In some cases, the groove direction can be parallel to and aligned with the central axis 122. In some cases, the waveguide alignment member 115 can instead comprise a cylindrical hole (not shown) capable of receiving and aligning an optical waveguide 120 which can be an optical fiber. The optical waveguide 120 can be any suitable waveguide including, for example, a planar waveguide, a single mode optical fiber, or a multimode optical fiber. In some cases, the optical waveguide 120 is a multimode optical waveguide suitable for wavelengths in a range from about 600 nanometers to about 2000 nanometers. In one particular embodiment, the optical waveguide 120 can have a circular cross-sectional profile. In some cases, the optical waveguide can instead have a polygonal cross-sectional profile.

The light redirecting member 130 includes the input surface 132 for receiving input light 140 along an input axis 142 from the optical waveguide 120, a curved reflective surface 134 for reflecting the received input light 140 as a redirected light 150 propagating along a different redirected axis 152, and an output surface 136 for receiving the redirected light 150 and transmitting the redirected light 150 as an output light 155 propagating along the output axis 156. The input surface 132 can be a planar surface that is substantially perpendicular to the input axis 142 and/or substantially parallel to the redirected axis 152 in some embodiments. The output surface 136 can be a planar surface that is substantially parallel to the input axis 142 and/or substantially perpendicular to the redirected axis 152 in some embodiments.

In FIG. 1, the redirected axis 152 is shown to be within a first plane (i.e., the XZ plane) of the XYZ Cartesian coordinate system, and the input axis 142 and redirected axis 152 form a redirection angle φ between them. The redirection angle φ can be any desired angle suitable for the application, and can be, for example, more than 90 degrees, or about 90 degrees, or less than 90 degrees, e.g., about 80 degrees, or about 70 degrees, or about 60 degrees, or about 50 degrees, or about 40 degrees, or about 30 degrees, or even less than about 30 degrees. In one particular embodiment shown in FIG. 1, the redirection angle φ is about 93 degrees. In some cases, the central axis 122 of the optical waveguide 120 can be coincident with the input axis 142; however, in some cases the optical waveguide 120 can be aligned to the input surface 132 so that the input axis 142 and the central axis 122 form an angle between them (not shown) as might be caused by refraction at the waveguide end facet or the input surface of the light coupling unit.

In some embodiments, the axis of revolution 106 is disposed at a first angle, α1, with respect to the input axis 142 and is disposed at a second angle, α2, with respect to the redirected axis 152 and/or the output axis 156. In some cases α1=α2 and in some cases α1≠α2. For example α1 and α2 can be between about 40 degrees and about 50 degrees. In some implementations, α1=α2=45 degrees. In some cases, the lowest aberration and the lowest insertion loss are achieved when α1=α2.

In some embodiments, the output axis 152 may be oriented at a 90 degree angle with respect to the input axis 142 as illustrated in FIG. 1. In general, the output axis 152 and the input axis 142 may be oriented at non-90 degree angles to one another. The input light 140 has a first divergence half-angle, θi, where the first divergence half-angle θi is between about 3 degrees and about 10 degrees, or between about 5 degrees and about 8 degrees, or about 7 degrees.

The redirected light 150 can be substantially collimated within the light coupling unit 100. The redirected light 150 has a second divergence half-angle θo that can, in some cases, be a convergence half-angle θo, where the second divergence is less than the first divergence. In some cases, the second divergence or convergence half-angle θo is less than about 5 degrees, or less than about 4 degrees, or less than about 3 degrees, or less than about 2 degrees, or less than about 1 degree.

In some cases, light exiting the optical waveguide 120 received and aligned by the waveguide alignment feature 115 propagates along an optical path from the input surface 132 to the output surface 136, such that the redirected light 150 has a minimum beam size (e.g. cross-sectional area) located near the output surface 136. For embodiments employing single-mode waveguides, the waist of the redirected beam may be located near the output surface. In one particular embodiment, the input light 140 is a divergent light beam, and the redirected light 150 is a substantially collimated light beam, the collimation being limited by diffraction characteristic of the beam size The reflective surface 134 can be any suitably shaped reflector capable of redirecting the input light 140 having a first divergence, to a redirected light 150 having a second divergence that is smaller than the first divergence. In various embodiments, the curved reflective surface 134 may be a toroidal surface, or an elliptical surface, for example A curved intersection of the surface 134 with the XZ plane can be described or accurately approximated by an arc 134a having a radius of curvature "R" measured from a center 105 of the circular arc 134a. The arc center 105 lies on a line that bisects the redirection angle ϕ between the input axis 142 and the redirected axis 152. The surface 134 is further characterized by an axis of revolution 106, disposed in the XZ plane, and intersecting the input axis 142 at a geometrical focus 108. The geometrical focus 108 is one focus of an ellipse, a portion of which is best approximated by arc 134a. The axis of revolution 106 is non-parallel and tilted with respect to the redirected axis 152 and/or the output axis 156 as shown in FIG. 1. For example, a toroidal or ellipsoidal surface 134, can be generated, e.g., where the input axis 142 intersects the surface 134, by revolving the arc 134a about the axis of revolution 106 (i.e., out of the XZ plane). The geometrical focus 108 is one optical focal length, f, from the optical focal point 107. The output surface 136 may be located one focal length, f, from the intersection of the input axis 142 and the curved reflective surface 134.

The focal length, f, can be measured from focal point 107 to the intersection of the input axis 142 and the arc 134a is less than the radius of curvature, R, and can be characterized by the expression:

$$R = \frac{2f}{\tan\left(\frac{\pi - \phi}{2}\right)} \sqrt{\tan\left(\frac{\pi - \phi}{2}\right)^2 + 1},$$

where f is the optical focal length and ϕ is the interior angle between the input axis and the redirected axis. For example, when angle ϕ=90 degrees (i.e., π/2) and f=0.60 mm, R=1.697 mm. In one particular embodiment, the light redirecting member 130 can be designed such that the path of the input light 140 and redirected light 150 travels a combined distance of 2f from the waveguide end face surface 124 to the output surface 136.

The reflective surface 134 can be made to be reflective by including a reflective coating, such as, for example, a multilayer interference reflector such as a Bragg reflector, or a metal or metal alloy reflector, both of which can be suitable for use with a light redirecting member 130 that is either solid material or a hollow cavity, as described elsewhere. In some cases, for a light redirecting member 130 that is a solid material, the reflective surface 134 can instead use total internal reflection (TIR) to redirect the input light 140. In order for TIR to be an effective, the connector housing 110 of unitary light coupling unit 100 can further include an internal perimeter 119 at least partially surrounding a cavity 118, positioned such that the reflecting surface 134 of light redirecting member 130 can be protected from contamination that can frustrate TIR at the reflecting surface 134, as known to one of skill in the art.

The light redirecting member 130 can be fabricated from any suitably transparent and dimensionally stable material including, for example, polymers such as a polyimide. In one particular embodiment, light redirecting member 130 can be fabricated from a dimensionally stable transparent polyimide material such as, for example, Ultem 1010 Polyetherimide, available from SABIC Innovative Plastics, Pittsfield Mass., or Zeonex K26r cyclic olefin polymer available from Zeon Specialty Materials, San Jose, Calif. In some cases, the optical waveguide 120 can be adhesively secured in a groove of the waveguide alignment member 115. In one particular embodiment, an index matching gel or adhesive may be inserted between the light redirecting member 130 and the optical waveguide 120. By eliminating any air gap in this area, refraction and Fresnel losses may be reduced.

The center of the circular arc 105 may be located on a radius perpendicular to the axis of revolution 106 and intersecting the point of redirection of the central rays of the input 140 and redirected 150 light beams as shown in FIG. 1. The axis of revolution 106 intersects the input axis 142 at a point one focal length behind the end face 124 of the optical waveguide 120, for example.

The axis of revolution 106 of the curved reflective surface 134 is tilted with respect to the redirected axis 152 and/or the output axis 156. Additionally, the waveguide alignment member is configured such that the end face 124 of the optical waveguide 120 is positioned at a location that is not a geometric focus 108 of the curved reflective surface 134. For example, in some embodiments, the end face 124 of the optical waveguide 120 may be located about halfway between the curved reflective surface 134 and the geometric focus 108. This arrangement provides redirected light that is substantially collimated rather than being substantially convergent or divergent within the light coupling unit. As previously discussed, the redirected light 150 may have a second divergence or convergence half-angle θo. In some cases, the second divergence or convergence half-angle θo is less than about 5 degrees, or less than about 4 degrees, or less than about 3 degrees, or less than about 2 degrees, or less than about 1 degree.

Figure 2A:
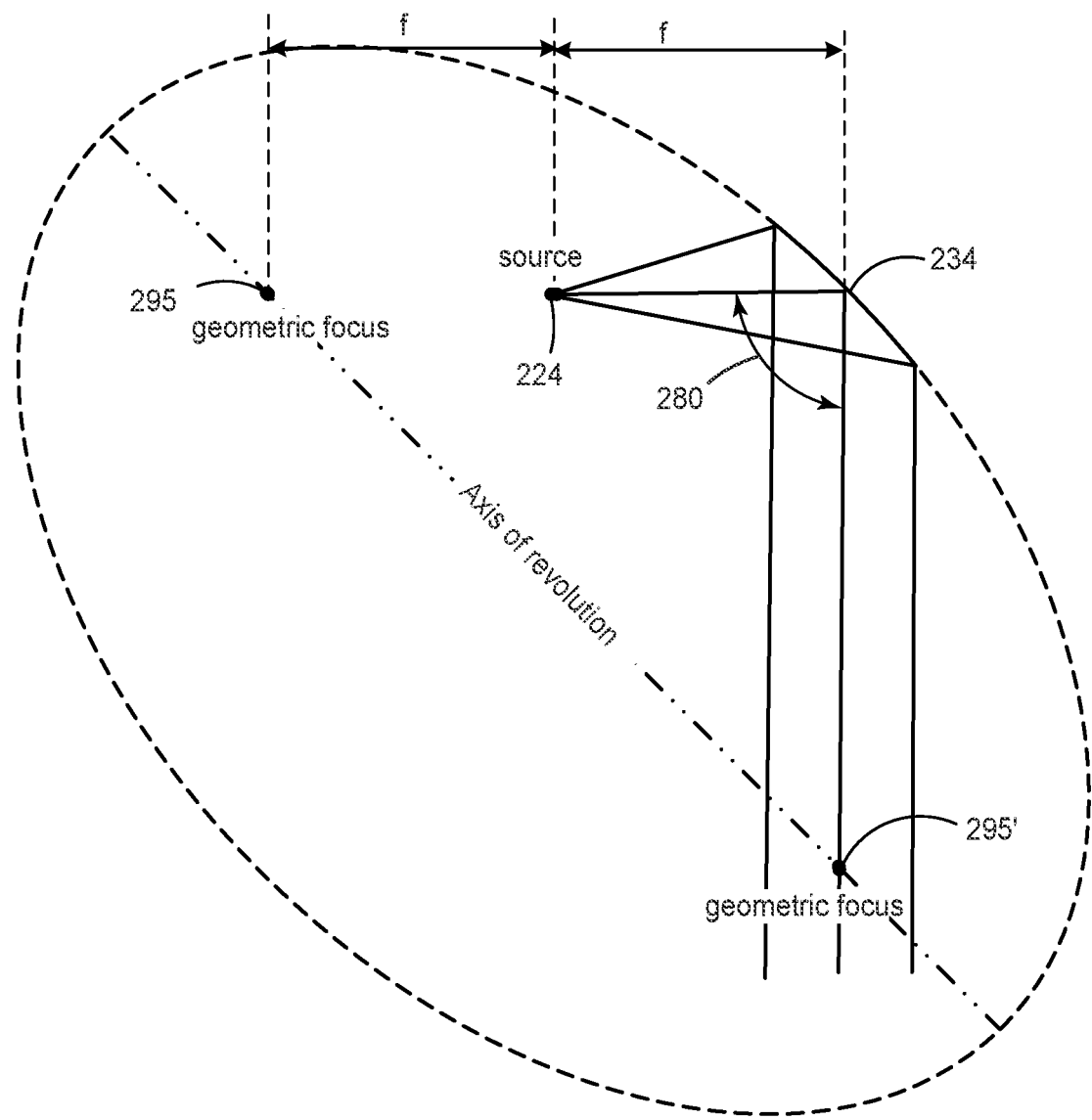
FIGS. 2A and 2B depict an elliptical cross section of a reflector illustrating the relationship between the geometrical focus and the reflective surface in accordance with some embodiments.

The curved reflective surface 134 may be a tilted elliptical surface or a tilted toroidal surface which very closely approximates a tilted elliptical surface, wherein tilted refers to an tilt angle between the axis of revolution of the surface with respect to the redirected or output light beam axis 152, 156. FIG. 2A depicts an elliptical cross section of a reflector 200 illustrating the relationship between the eccentricity of the ellipsoid and the desired reflection angle, ϕ. The eccentricity of the ellipse can be defined according to its major and minor axis (a and b) as:

$$\varepsilon = \sqrt{1 - \left(\frac{b}{a}\right)^2}.$$

In this design, the eccentricity depends on the desired reflection angle, ϕ:

$$\varepsilon = \sin\left(\frac{\phi}{2}\right).$$

Thus, for a 90-degree reflection (ϕ=90 degrees) the eccentricity should be $1/\sqrt{2}$.

Figure 2B:
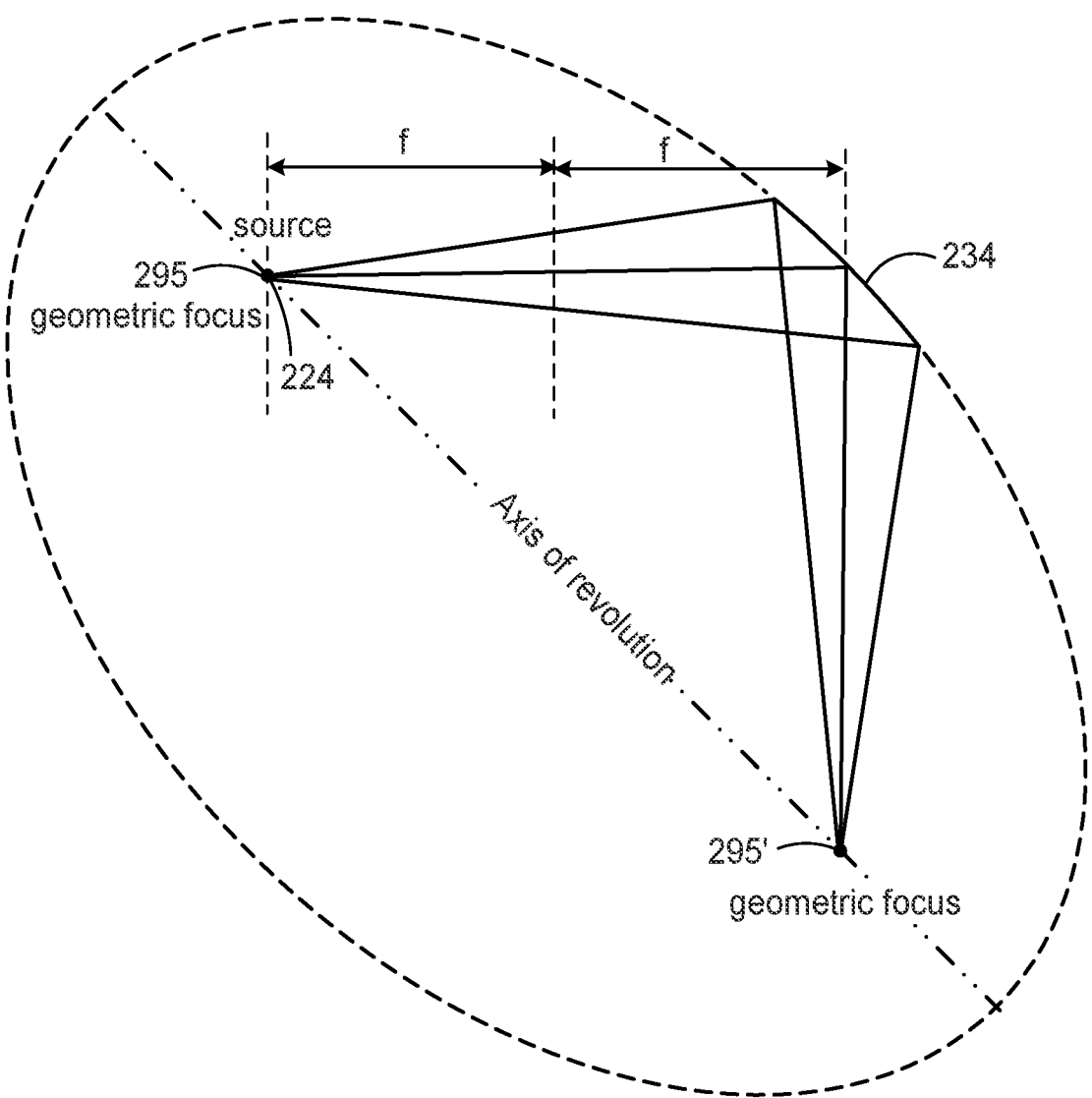

FIGS. 2A and 2B depict an elliptical cross section of a reflector illustrating the relationship between the geometrical focus 210 and the reflective surface 234. FIG. 2B shows an elliptical cross section of a reflector 200 wherein the light source 224 (e.g., the end face of the waveguide) is at the geometric focus 295 of the surface 234. The geometrical focus 295 of the ellipsoidal surface 234 is on the axis of revolution 206. FIG. 2B illustrates convergence of the reflected light when the light source 224 is positioned at a geometric focus 295 of the surface 234, as is characteristic of an ellipsoidal surface. Light emitted from the geometric focus 295 on the axis of revolution is reflected by the surface 234; the reflected light converges to a complementary geometric focus 295' on the axis of revolution 206.

In contrast, FIG. 2A illustrates a scenario in which the light source 224 is not located at a geometrical focus 295 on the axis of revolution 206 but located one optical focal length from the surface 234 and one focal length away from the geometric focus 295. As shown in FIG. 2A when the light source 224 is not located at the geometrical focus 295, but is located midway along the input axis between geometric focus 295 and the surface 234, the reflected light is substantially collimated at the complementary focus point 295'. The desired reflection angle 280 is controlled by selecting an appropriate angle for the axis of rotation relative to the input axis.

Figure 3A:
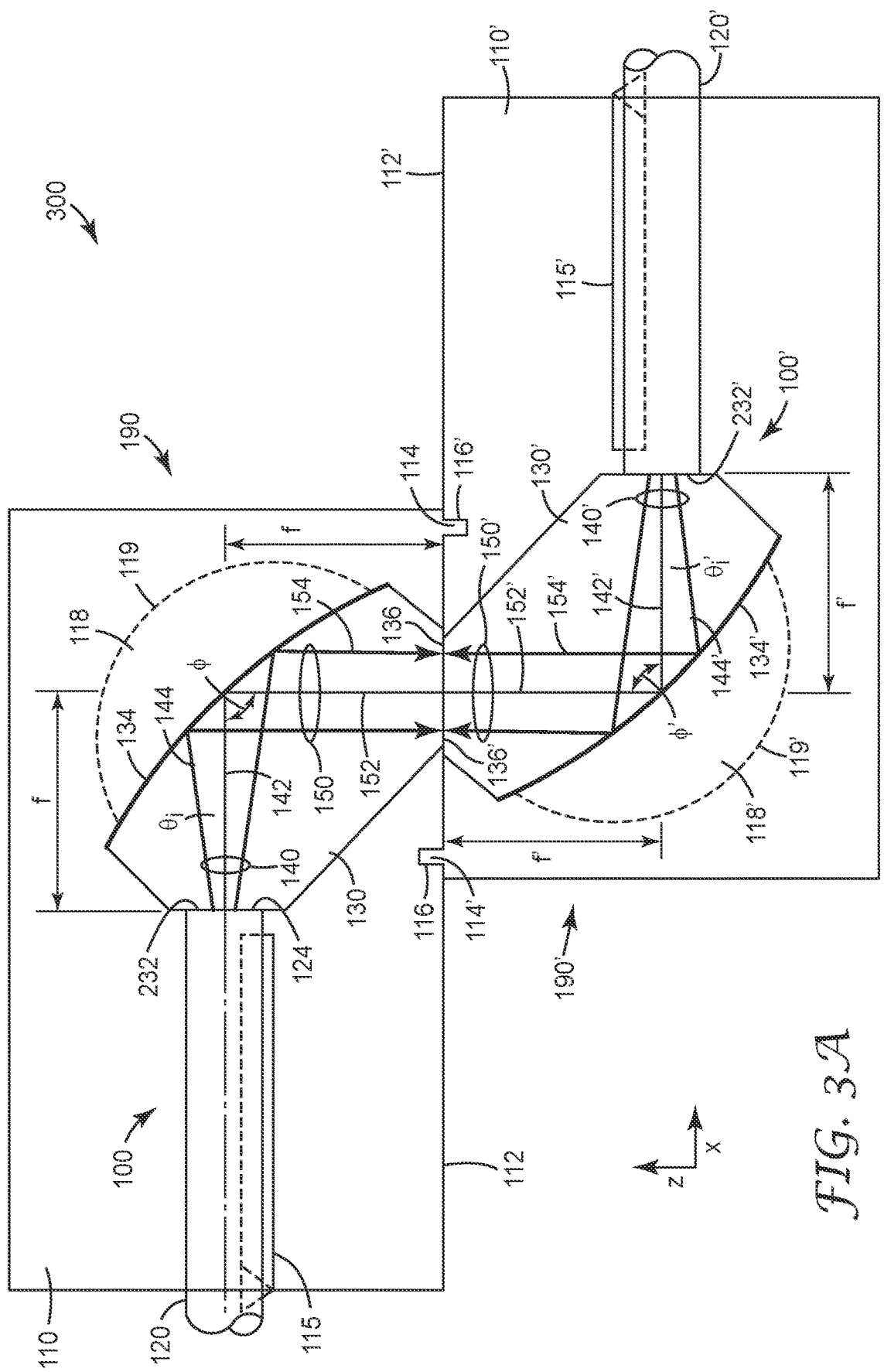
FIG. 3A shows a schematic cross-sectional view of a connector assembly according to one aspect of the disclosure.

FIG. 3A shows a schematic cross-sectional view of a connector assembly 300, according to one aspect of the disclosure. Each of the elements 100-160 shown in FIG. 3A correspond to like-numbered elements 100-160 shown in FIG. 1, which have been described previously. For example, optical waveguide 120 of FIG. 3A corresponds to optical waveguide 120 of FIG. 1, and so on. In FIG. 3A, connector assembly 300 includes a first unitary light coupling unit 100 and a second unitary light coupling unit 100' that are coupled together such that mating surfaces 112, 112' are adjacent each other; alignment features 114 and 116 are aligned with alignment features 116' and 114', respectively; and the output surface 136 of first unitary light coupling unit 100 is proximate to and facing the output surface 136' of second unitary light coupling unit 100'. In FIG. 3A, each of the first unitary light coupling unit 100 and a second unitary light coupling unit 100' are hermaphroditic coupling units, which can be mated to each other to enable a low-loss optical connection. The connector assembly 300 is configured so that light exiting the first optical waveguide 120 enters the second optical waveguide 120' after being redirected by the reflective surface 134, 134' of the first and second unitary light coupling units 100, 100'.

The light exiting the first optical waveguide propagates a first propagation distance (f+f+f'+f') between the waveguide end face 124 of the first light coupling unit 100 and the end face 124' of the second light coupling unit 100', the propagation distance (f+f+f'+f') being substantially equal to two times a sum of the focal length f of the first unitary light coupling unit and the focal length f' of the second unitary light coupling unit. In some cases, the focal length "f" of the first unitary light coupling unit 100 is substantially equal to the focal length "f" of the second unitary light coupling unit 100'. In some cases, the first optical waveguide 120 comprises a first multimode optical fiber and the second optical waveguide 120' comprises a second multimode optical fiber. In other cases, the first optical waveguide 120 comprises a first single mode optical fiber and the second optical waveguide 120' comprises a second single mode optical fiber.

Figure 3B:
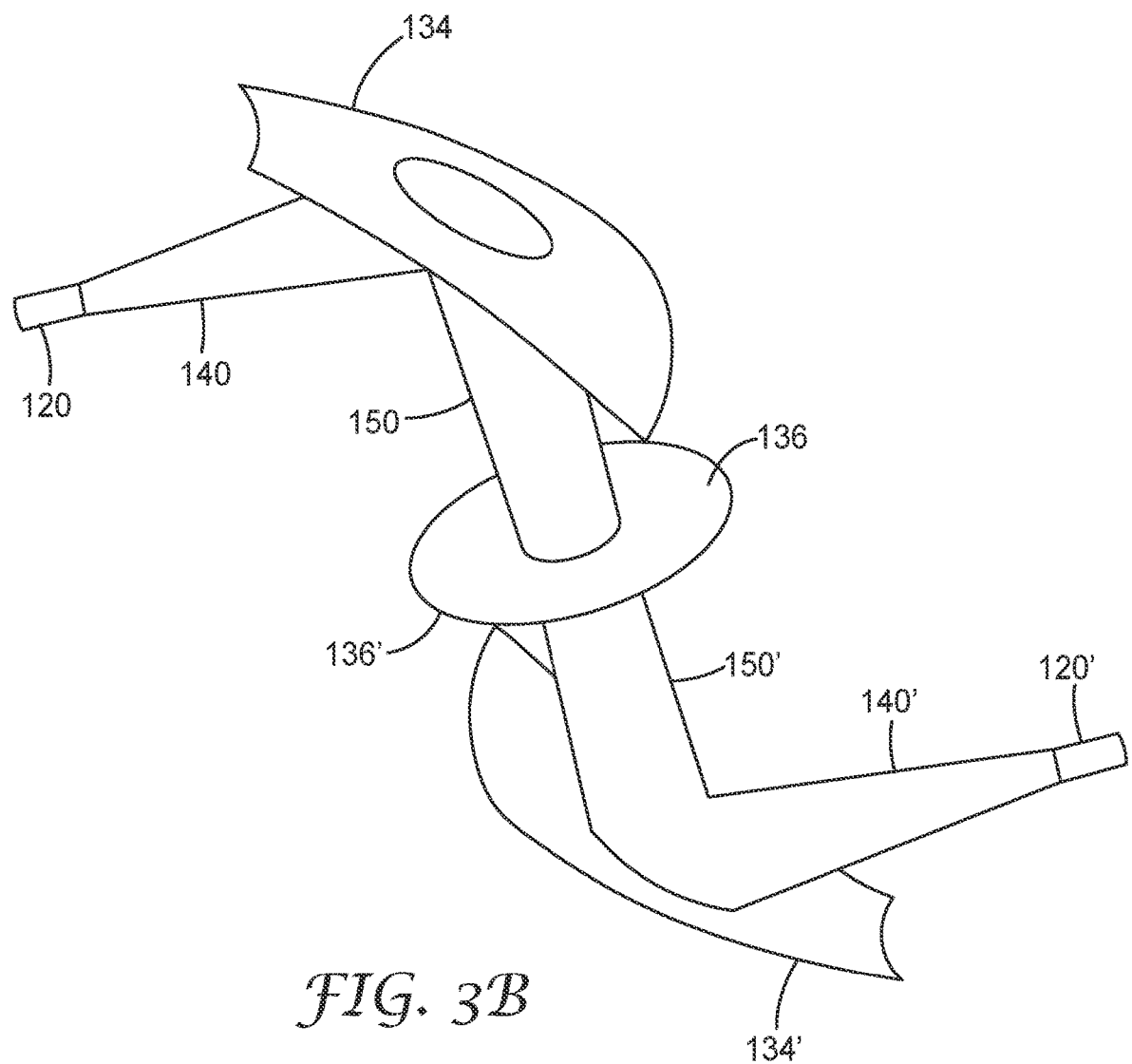
FIG. 3B shows a perspective schematic view of light paths through the connector assembly of FIG. 3A.

FIG. 3B shows a perspective schematic view of light paths through the connector assembly 300 of FIG. 3A obtained by ray tracing, according to one aspect of the disclosure. In the embodiment shown in FIG. 3B, the first and second reflective surfaces 134, 134' are right angle toroidal mirrors. In FIG. 3B, first optical waveguide 120 injects first input light 140 which is reflected from first toroidal reflector 134 as first redirected light beam 150. First redirected light beam 150 passes through first output surface 136 of first light redirecting member 130 and enters second light redirecting member 130' through second output surface 136' as second redirected light beam 150'. Second redirected light beam 150' is reflected from second toroidal reflector 134' as second input light 140' that enters second optical waveguide 120'.

The divergence of rays 140 exiting the core of the optical waveguide 120 is representative of the numerical aperture of the waveguide. The light propagates within the polymer of the light coupling unit and for sufficiently large reflection angles, ϕ, the reflection can occur by total internal reflection. In a typical connector, the light would propagate within a polymer (e.g., Zeonex K26r) and for sufficiently large angles (ϕ, FIG. 3A), the reflection can occur by total internal reflection. The disk 136, 136' in the center of the model represents the interface between two connectors.

Raytracing has been used to calculate the component of the insertion loss due to aberration for an optical connector that includes a waveguide having a multimode 50 μm diameter fiber core. The tilted ellipsoidal and toroidal designs described herein provide lower insertion loss than previous connectors. Table 1 summarizes the calculated insertion loss due to aberration for 90-degree reflections and 600 μm focal lengths.

TABLE 1

| DESIGN | INSERTION LOSS |
| --- | --- |
| Paraboloid | 0.53 dB |
| Toroid, axis parallel to output beam | 0.36 dB |
| Tilted ellipsoid | 0.27 dB |
| Tilted toroid (45 degrees) | 0.24 dB |

It will be appreciated from TABLE 1 that the insertion loss due to aberration of a connector assembly incorporating a tilted reflector in accordance with embodiments discussed herein may be less than about 0.35 dB, or less than about 0.325 dB, or less than about 0.3 dB or less than about 0.275 dB, or less than about 0.25 dB at a wavelength in a range from 600 to 2000 nanometers. Measured insertion loss of the connector assembly incorporating the tilted reflector in accordance with embodiments discussed herein can be less than about 0.4 dB.

Figure 4B:
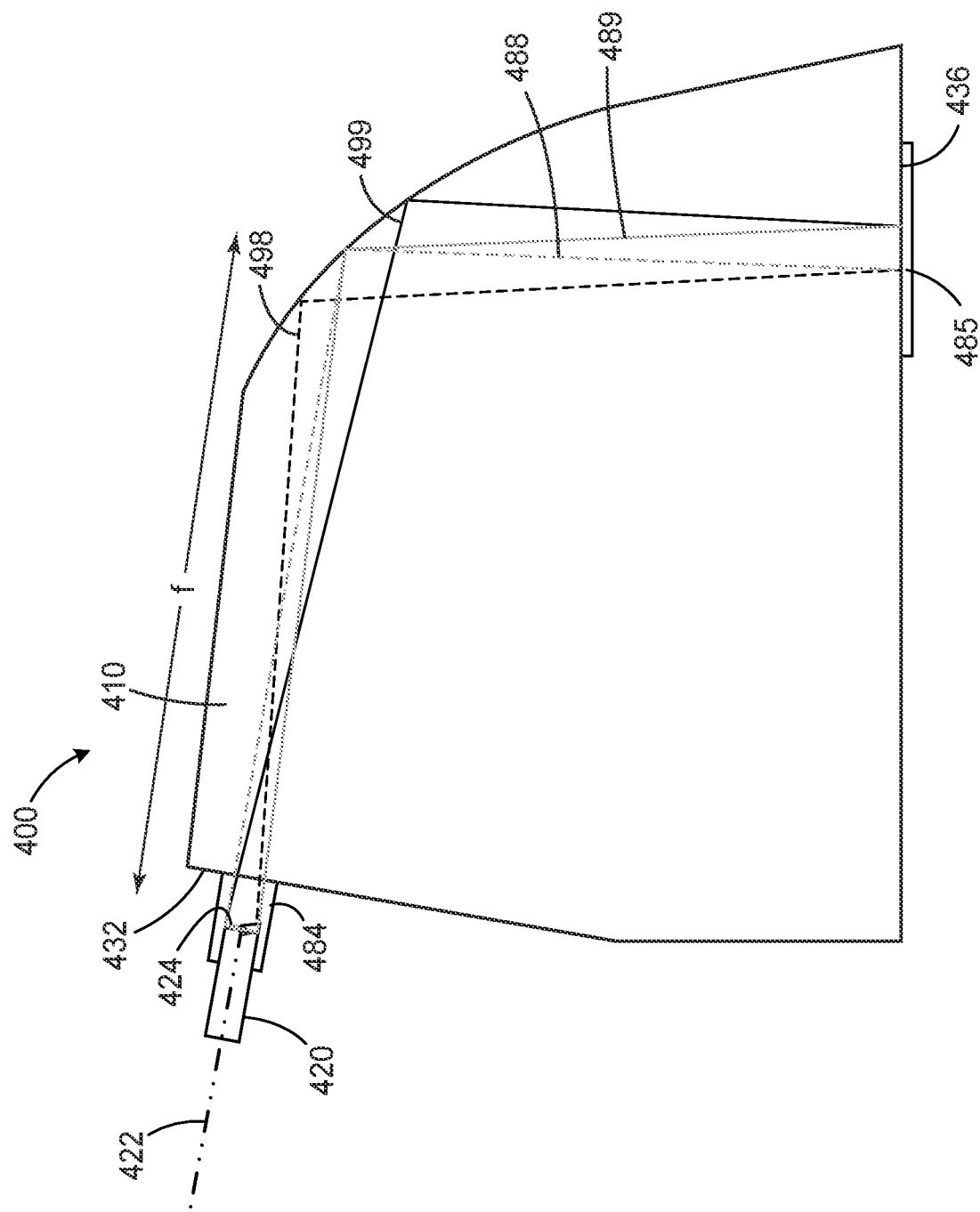

Low-back reflection (return loss) is an attribute of high-performance optical connectors and adaptors. Previous design physical-contact connectors manage back reflection by providing angle-polished waveguide end faces. FIGS. 4A and 4B are schematic diagrams that illustrate ray-tracing of a light coupling unit 400 of a typical previous design.

The input surface 432 of the light coupling unit 400 is nominally normal to the central axis 422 of the optical waveguide 420. An index matching adhesive 484 is used to optically couple the angle-cleaved waveguide end face 424 to the input surface 432. However, because the light redirecting portion 421 of the light coupling unit 400 has a different refractive index than the waveguide core or the adhesive, reflections occur. A large fraction of the light reflected from the input surface 432 is coupled back into the waveguide core.

The curved reflective surface 434 redirects the input light toward the output surface 436. A small fraction of the collimated redirected light at the output surface 436 is reflected, despite the use of a thin-film antireflection coating 485. Because the collimated redirected beam 491 impinges on the output surface 486 at normal incidence, a portion of the collimated redirected light 491 can be reflected at the output surface 436 and re-focused by the curved reflective surface 434 back into the waveguide 420. FIG. 4A illustrates redirected light 491 impinging at normal incidence on the input surface 432 and the antireflection (AR)-coated output surface 436 of the light coupling unit 400. FIG. 4B illustrates that light from the waveguide 420 is partially back reflected from both the input surface 432 and the AR-coated output surface 436 of the light coupling unit 400. The solid 499 and dashed 498 lines represent two rays that originate at opposite edges of the waveguide core. The reflected light, represented by solid 489 and dashed 488 lines is strongly coupled back into the waveguide 420, forming an inverted image of the core on the end facet. These reflections at the input and output surfaces 432, 436 can result in unacceptable back reflection in the waveguide.

Figure 5A:
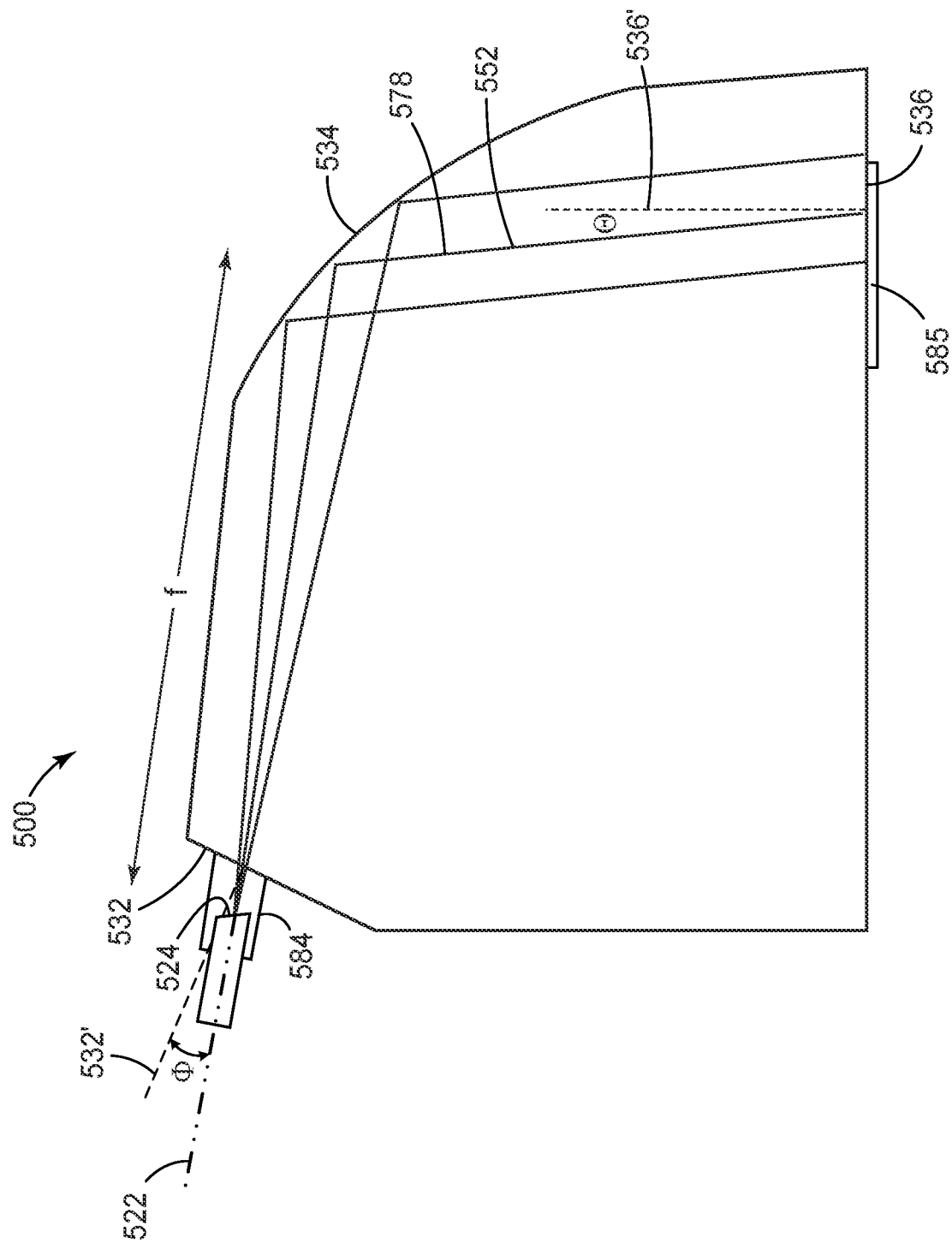

In some embodiments, back reflection can be eliminated or significantly reduced by appropriately angling the input surface and/or output surface with respect to the incident light, as shown in FIGS. 5A and 5B. FIGS. 5A and 5B are schematic diagrams showing ray tracing of a portion of an example light coupling unit 500 in accordance with some embodiments.

As illustrated in FIGS. 5A and 5B, in some embodiments, the normal 532' to the input surface 532 is at angle $\Phi$ with respect to the axis 522 of the optical waveguide 520. Therefore, the central ray of the light reflected by the input surface 532 is reflected at an angle of $2\Phi$ with respect to the waveguide axis 522. Assuming the adhesive 584 is index matched to the waveguide core, the reflected light will not be significantly coupled back into the waveguide core if all reflected rays fall outside of the waveguide's numerical aperture. That is, if $\Phi > \Theta_{NA}$, where $\Theta_{NA}$ is the angle associated with the numerical aperture of the fiber: $\Theta_{NA} = a \sin(NA/n_{core})$, and where NA is the numerical aperture of the fiber, and $n_{core}$ is the refractive index of the waveguide core. In some embodiments, $\Phi > 9$ degrees, for example According to some embodiments, the input surface 532 is angled with respect to an axis 522 of the optical waveguide 520 such that less than about 1 percent of light reflected by the input surface 532 is coupled back into the waveguide 520.

The angled input surface 532 need not be planar, e.g., it can be spherical, cylindrical, toroidal, or other useful lens shape, provided that the range of angles of the surface relative to the waveguide optic axis reduces or precludes reflections back into the waveguide core. For example, in some embodiments, substantially all of the input light, e.g., more than about 80 percent, more than about 85 percent, or more than 90 percent, or more than 99 percent, that is reflected by the input surface 532 is reflected at angles to the waveguide axis greater than the numerical aperture angle of the optical waveguide 520. For example, in some embodiments, less than about 20 percent, less than 15 percent or less than 10 percent of light that is reflected by the input surface 532 is coupled into the core of the optical waveguide 520.

Although not shown in FIGS. 5A and 5B, an antireflective coating and/or antireflective nanostructure can be applied to the input surface 532 to reduce the reflections at the interface between the adhesive 584 and the light coupling unit 500.

Additionally or alternatively, the prescription of the total-internal-reflection lens formed by curved reflective surface 534 can be designed as described above to redirect and collimate light 578 from the optical waveguide 520 such that the redirected axis 552 of the redirected light (the redirected axis 552 lies along the path of the central ray of the redirected light) makes an angle, $\Theta$, with respect to the normal 536' to the output surface 536 of the light coupling unit 500. As a result, any light reflected from the output surface 536 is refocused by the TIR lens 534 to a spot away from the waveguide core. As such, substantially all of the light that is reflected by the output surface 536 and focused by the TIR lens 534 falls outside the core of the waveguide 520 and is therefore not coupled back into the waveguide. For example, about 80 percent, about 85 percent, or about 90 percent of the light that is reflected by the output surface 536 and re-focused by the TIR lens 534 falls outside the core of the waveguide. According to some embodiments, less than 10% or even less than 1% of redirected light that is reflected by the output surface 536 is refocused by the curved reflective surface 534 into the core of the waveguide 520.

In FIG. 5B, the solid 599 and dashed 598 lines represent two rays that originate at opposite edges of the waveguide core. For small $\Theta$, an inverted image of the waveguide core is centered a distance $s = 2f\Theta$ from the waveguide axis 522 which is the center of the core, where f is the focal length of the TIR lens, and $\Theta$ is expressed in radians. The redirected light, represented by solid 589 and dashed 588 lines, is reflected by the output surface 536 and is focused by the curved reflective surface 534 to a point that is the distance, s, from a center of a core of the waveguide 520. To reduce coupling of this reflected image back into the waveguide core, the distance s should be greater than the diameter of the waveguide core (or optical fiber mode), D. In some embodiments the incident angle $\Theta$ is greater than D/2f and is greater than about 2.5 degrees.

Connected light coupling unit pairs incorporating these angled input and output surfaces can achieve return loss values of 45 dB, 55 dB or even better at 1310 nm.

In the embodiments described herein, the output surface 536 need not be planar, e.g., the output surface 536 can be spherical, cylindrical, toroidal, or other useful lens shape, provided that the range of angles of the surface 536 relative to the axis of the output beam reduces or precludes reflections back into the waveguide core.

The choice of non-zero incident angles at the input and output surfaces may involve adjustment to the design of the light coupling unit to accommodate the associated refraction of the transmitted light. At the input surface this refraction is typically negligible because of the index-matched adhesive. At the output surface, the refracted beam angle into air can be taken into account using ray-tracing techniques.

Figure 6A:
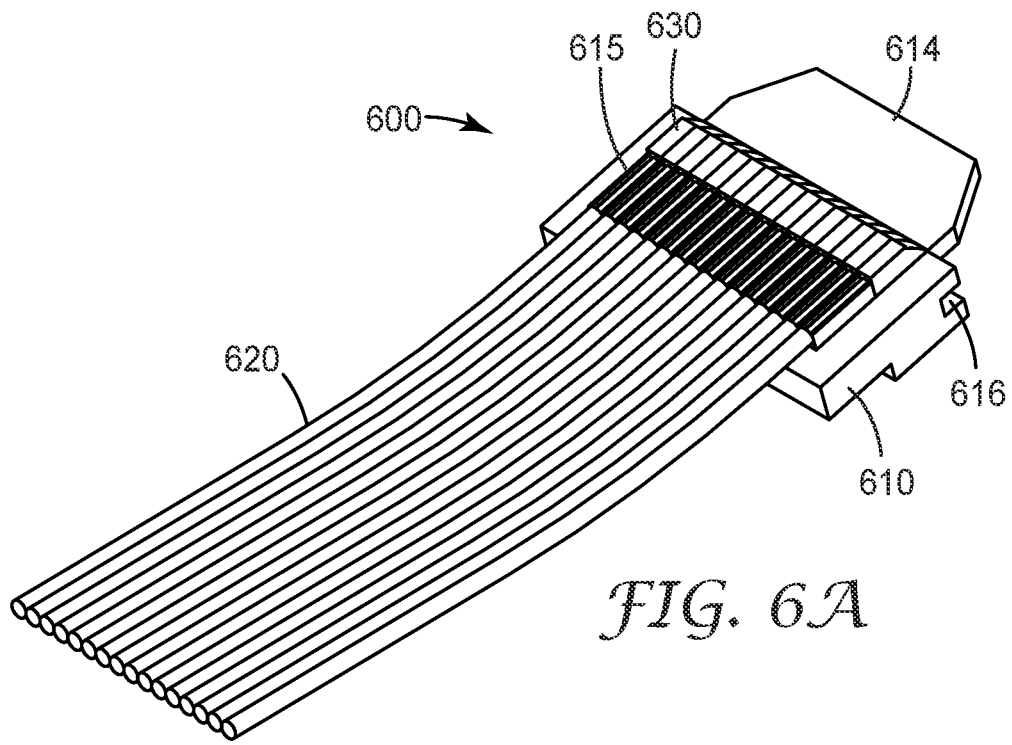
FIG. 6A shows a schematic perspective view of a unitary light coupling unit 600 according to one aspect of the disclosure.

FIG. 6A shows a schematic perspective view of a unitary light coupling unit 600, according to one aspect of the disclosure. Each of the elements 600-630 shown in FIG. 6A correspond to like-numbered elements 100-130 shown in FIG. 1, which have been described previously. For example, optical waveguide 620 of FIG. 6A corresponds to optical waveguide 120 of FIG. 1, and so on. In FIG. 6A, a plurality of optical waveguides 620 are received and aligned by waveguide alignment member 615 to direct light from the optical waveguide to the light redirecting member 630 within connector housing 610. Light coupling unit 610 includes alignment features 614, 616.

Figure 6B:
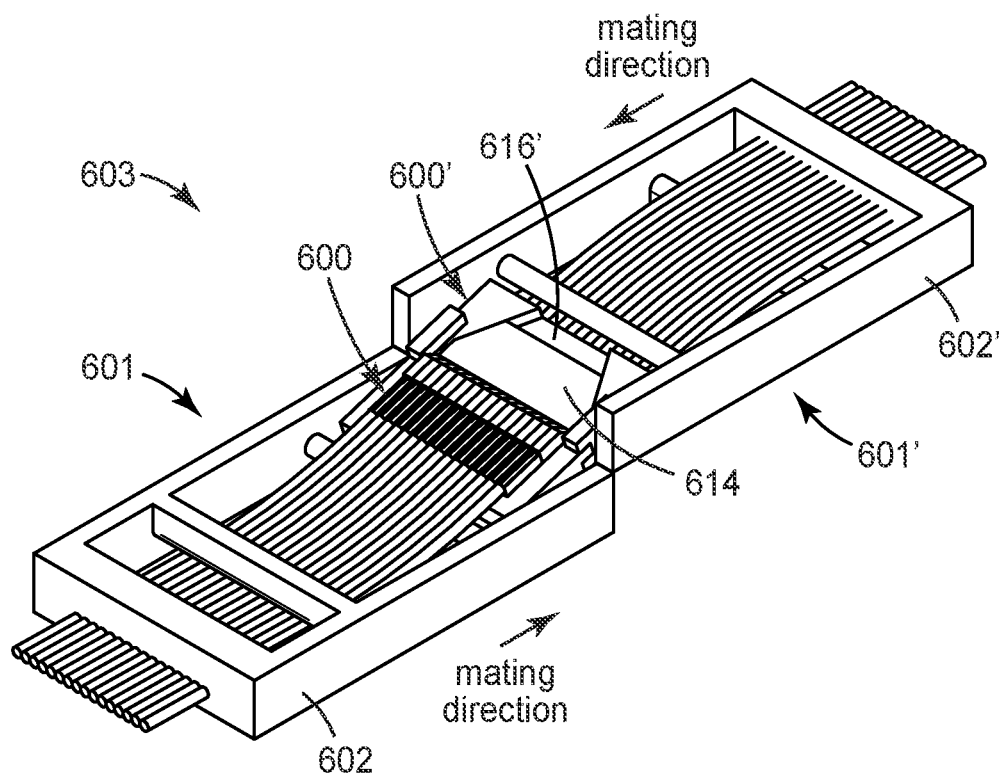
FIG. 6B shows a schematic perspective view of a connector assembly according to one aspect of the disclosure.

FIG. 6B shows a schematic perspective view of a connector assembly 603, according to one aspect of the disclosure. The connector assembly 603 can be similar to those multifiber connector assemblies shown, for example, in U.S. Patent Application Ser. No. 61/652,478 entitled OPTICAL INTERCONNECT, which provides compact, reliable optical interconnects; however, the light redirecting member 630 of the present invention provides advantages in multifiber connector assemblies that were not previously appreciated. Connecter assembly 603 includes a first optical connector 601 having a first unitary light coupling unit 600 and a second optical connector 601' having a second unitary light coupling unit 600', according to one aspect of the disclosure. Each of the first and second unitary light coupling units 600, 600' can be hermaphroditic connectors, as described elsewhere. The first and second optical connectors 601, 601' can be protected and supported by first and second connector frames 602, 602', that can enable more reliable matching of the respective first and second alignment features 614, 616, 614', 616' of each of the unitary light coupling units 600, 600'.

Each of the multifiber connector assemblies can be adapted to be interconnected using a variety of connection schemes, as known in the art, for example as further described in copending PCT Publication Nos. WO2013/048730 entitled OPTICAL CONNECTOR HAVING A PLURALITY OF OPTICAL FIBRES WITH STAGGERED CLEAVED ENDS COUPLED TO ASSOCIATED MICROLENSES; WO2013/048743 entitled OPTICAL SUBSTRATE HAVING A PLURALITY OF STAGGERED LIGHT REDIRECTING FEATURES ON A MAJOR SURFACE THEREOF; and in U.S. patent application Ser. Nos. 61/652,478 entitled OPTICAL INTERCONNECT, and 25 61/710,083 entitled OPTICAL CONNECTOR.

Items described in this disclosure include:

Item 1. A light coupling unit for use in an optical connector, comprising:
   a waveguide alignment member configured to receive and align at least one optical waveguide; and
   a light redirecting member, comprising:
      an input surface configured to receive input light from an end face of the optical waveguide;
      a curved reflective surface configured to receive light from the input surface propagating along an input axis and to redirect the light received from the input surface, the redirected light propagating along a different redirected axis; and
      an output surface configured to receive the redirected light from the curved reflective surface and to transmit the redirected light received from the output surface as output light propagating along an output axis and exiting the light redirecting member, a curved intersection of the curved reflective surface and a first plane formed by the input and redirected axes having a radius of curvature, the curved reflective surface having an axis of revolution disposed in the first plane, wherein the axis of revolution forms a first angle with the redirected axis, the first angle being non zero, and the waveguide alignment member is configured such that the end face of the optical waveguide is positioned at a location that is not a geometric focus of the curved reflective surface.

Item 2. The light coupling unit of item 1, wherein the axis of revolution is disposed at a second angle with respect to the input axis and the first and second angles are equal.

Item 3. The light coupling unit of item 2, wherein the first and second angles are about 45 degrees.

Item 4. The light coupling unit of item 2, wherein the first and second angles are in a range of about 40 to about 50 degrees.

Item 5. The light coupling unit of item 2, wherein the first and second angles are about 43.5 degrees.

Item 6. The light coupling unit of any of items 1 through 5, wherein the curved surface is a toroidal surface.

Item 7. The light coupling unit of any of items 1 through 5, wherein the curved surface is an ellipsoidal surface.

Item 8. The light coupling unit of any of items 1 through 7, wherein a second divergence of the reflected light along the redirected axis is less than a first divergence of the input light along the input axis.

Item 9. The light coupling unit of any of items 1 through 8, wherein the axis of revolution is disposed at one optical focal length, f, measured from the input surface along the input axis and at two focal lengths measured from the curved reflective surface measured along the input axis, the focal length being less than the radius of curvature.

Item 10. The light coupling unit of item 9, wherein the radius of curvature, R, is:

$$R = \frac{2f}{\tan\left(\frac{\pi-\phi}{2}\right)}\sqrt{\tan\left(\frac{\pi-\phi}{2}\right)^2 + 1},$$

wherein $\phi$ is an angle between the input axis and the redirected axes.

Item 11. The light coupling unit of item 9, wherein the output surface is disposed at one focal length measured along the redirected axis from the curved reflective surface.

Item 12. The light coupling unit of any of items 1 through 11, wherein the light coupling unit is a unitary structure.

Item 13. The light coupling unit of any of items 1 through 12, wherein the input surface is substantially perpendicular to the input axis.

Item 14. The light coupling unit of any of items 1 through 12, wherein the input surface is substantially perpendicular to the output surface.

Item 15. The light coupling unit of any of items 1 through 14, wherein an angle between the input axis and the redirected axis is less than 90 degrees.

Item 16. The light coupling unit of any of items 1 through 14, wherein an angle between the input axis and the redirected axis is greater than 90 degrees.

Item 17. The light coupling unit of any of items 1 through 14, wherein an angle between the input axis and the redirected axis is about 93 degrees.

Item 18. The light coupling unit of any of items 1 through 17, wherein the curved reflective surface reflects the light received from the input surface by total internal reflection.

Item 19. The light coupling unit of any of items 1 through 18, wherein the input surface is angled with respect to an axis of the optical waveguide.

Item 20. The light coupling unit of any of items 1 through 19, wherein the input surface is angled with respect to an axis of the optical waveguide such that substantially all input light that is reflected by the input surface is reflected at angles to a waveguide axis greater than a numerical aperture angle of the waveguide.

Item 21. The light coupling unit of any of items 1 through 20, wherein the input surface is angled with respect to an axis of the optical waveguide such that less than about 1 percent of light reflected by the input surface is coupled back into the waveguide.

Item 22. The light coupling unit of any of items 1 through 20, wherein the input surface is angled with respect to an axis of the optical waveguide such that input light that is reflected by the input face is reflected an angle, $\Phi$, wherein $\Phi$ is greater than a numerical aperture angle, $\Theta_{NA}$, of the optical waveguide and $\Phi$ is greater than 9 degrees.

Item 23. The light coupling unit of any of items 1 through 22, wherein a redirected axis of the redirected light makes an angle, $\Theta > D/2f$, with respect to a normal to the output surface, wherein D is a diameter of a core the waveguide and f is a focal length of the curved reflective surface.

Item 24. The light coupling unit of any of items 1 through 22, wherein a redirected axis of the redirected light makes an angle, $\Theta > D/2f$, and $\Theta > 2.5$ degrees, with respect to a normal to the output surface, wherein D is a diameter of a core the waveguide and f is a focal length of the curved reflective surface.

Item 25. The light coupling unit of any of items 1 through 24, wherein redirected light that is reflected by the output surface is focused by the curved reflective surface to a point that is a distance, s, from a center of a core of the waveguide, and s>D, wherein D is a diameter of a core the waveguide.

Item 26. The light coupling unit of any of items 1 through 25, wherein less than about 10% of redirected light that is reflected by the output surface is refocused by the curved reflective surface into a core of the waveguide.

Item 27. The light coupling unit of any of items 1 through 25, wherein less than about 1% of redirected light that is reflected by the output surface is refocused by the curved reflective surface into a core of the waveguide.

Item 28. A light coupling unit for use in an optical connector, comprising:
a waveguide alignment member configured to receive and align at least one optical waveguide; and
a light redirecting member, comprising:
an input surface configured to receive input light from an end face of the optical waveguide;
a curved reflective surface configured to receive light from the input surface propagating along an input axis and to redirect the light received from the input surface, the redirected light propagating along a different redirected axis; and
an output surface configured to receive the redirected light from the curved reflective surface and to transmit the redirected light received from the output surface as output light propagating along an output axis and exiting the light redirecting member, a curved intersection of the curved reflective surface and a first plane formed by the input and redirected axes having a radius of curvature, the curved reflective surface having an axis of revolution disposed in the first plane, wherein the axis of revolution is not parallel to the redirected axis and wherein the waveguide alignment member is configured such that the end face of the optical waveguide is positioned at a location about halfway between the curved reflective surface and a geometric focus of the curved reflective surface.

Item 29. A light coupling unit for use in an optical connector, comprising:
a waveguide alignment member configured to receive and align at least one optical waveguide; and
a light redirecting member, comprising:
an input surface configured to receive input light from an end face of the optical waveguide;
a curved reflective surface configured to receive light from the input surface propagating along an input axis and to reflect the light received from the input surface, the reflected light propagating along a different redirected axis; and
an output surface configured to receive light from the curved reflective surface and to transmit the light received from the output surface as output light propagating along an output axis and exiting the light redirecting member, a curved intersection of the curved reflective surface and a first plane formed by the input and redirected axes having a radius of curvature, the curved reflective surface having an axis of revolution disposed in the first plane, wherein the axis of revolution is not parallel to the redirected axis and wherein the redirected light has a redirected divergence or convergence half-angle θo that is less than about 5 degrees.

Item 30. An optical connector comprising:
a connector housing; and
at least one light coupling unit as in claim 1, wherein the optical connector is configured to mate with a mating optical connector along a mating direction, the mating direction being not parallel to the input axis.

Item 31. A connector assembly, comprising:
a first light coupling unit as in item 1 having at least one first optical waveguide received and aligned by the waveguide alignment member of the first light coupling unit, the first light coupling unit mated with a second light coupling unit as in claim 1 having at least one second optical waveguide received and aligned by the waveguide alignment member of the second light coupling unit, the output surface of the first light coupling unit being proximate to and facing the output surface of the second light coupling unit, the connector assembly being configured so that light exiting the first optical waveguide enters the second optical waveguide after propagating through the light redirecting members of the first and second light coupling units.

Item 32. The connector assembly of item 31, wherein light exiting the first optical waveguide propagates a first propagation distance between the input surface of the first light coupling unit and the input surface of the second light coupling unit, the propagation distance being substantially equal to two times a sum of the focal length of the first light coupling unit and the focal length of the second light coupling unit.

Item 33. The connector assembly of any of items 31 through 32, wherein the focal length of the first light coupling unit is substantially equal to the focal length of the second light coupling unit.

Item 34. A connector assembly, comprising:
a first light coupling unit as in claim 1 having at least one first multimode optical fiber received and aligned by the waveguide alignment member of the first light coupling unit mated with a second light coupling unit as in claim 1 having at least one second multimode optical fiber received and aligned by the waveguide alignment member of the second light coupling unit, the output surface of the first light coupling unit being proximate to and facing the output surface of the second light coupling unit, the connector assembly being configured so that light exiting the first optical waveguide enters the second optical waveguide after propagating through the light redirecting members of the first and second light coupling units, wherein optical insertion loss of the connector assembly due to aberration at a wavelength in a range from 600 to 2000 nanometers is less than about 0.3 dB.

Item 35. The connector assembly of item 33, wherein the optical insertion loss due to aberration is less than about 0.275 dB.

Item 36. The connector assembly of item 33, wherein a measured optical insertion loss is less than about 0.4 dB.

Item 37. A light coupling unit for use in an optical connector, comprising:
a waveguide alignment member configured to receive and align at least one optical waveguide; and
a light redirecting member, comprising:
an input surface configured to receive input light from an end face of the optical waveguide;

a curved reflective surface configured to receive light from the input surface propagating along an input axis and to reflect the light received from the input surface, the reflected light propagating along a different redirected axis; and an output surface configured to receive light from the curved reflective surface and to transmit the light received from the output surface as output light propagating along an output axis and exiting the light redirecting member, a curved intersection of the curved reflective surface and a first plane formed by the input and redirected axes having a radius of curvature, the curved reflective surface having an axis of revolution disposed in the first plane, wherein the input surface is angled with respect to an axis of the optical waveguide such that substantially none of the input light that is reflected by the input face is coupled into the waveguide.

Item 38. The light coupling unit of item 37, wherein the input surface is angled with respect to an axis of the optical waveguide such that input light that is reflected by the input face is reflected an angle, $\Phi$, wherein $\Phi$ is greater than a numerical aperture, $\Theta_{NA}$, of the optical waveguide and $\Phi$ is greater than 9 degrees.

Item 39. The light coupling unit of any of items 37 through 38, wherein the input surface is angled with respect to an axis of the optical waveguide such that less than about 20% of input light that is reflected by the input face is coupled back into the optical waveguide.

Item 40. The light coupling unit of any of items 37 through 39, wherein the input surface is angled with respect to an axis of the optical waveguide such that less than about 5% of input light that is reflected by the input face is coupled back into the optical waveguide.

Item 41. The light coupling unit of any of items 37 through 39, wherein the input surface is angled with respect to an axis of the optical waveguide such that less than about 1% of input light that is reflected by the input face is coupled back into the optical waveguide.

Item 42. A light coupling unit for use in an optical connector, comprising:

a waveguide alignment member configured to receive and align at least one optical waveguide; and a light redirecting member, comprising:

an input surface configured to receive input light from an end face of the optical waveguide;

a curved reflective surface configured to receive light from the input surface propagating along an input axis and to reflect the light received from the input surface, the reflected light propagating along a different redirected axis; and an output surface configured to receive light from the curved reflective surface and to transmit the light received from the output surface as output light propagating along an output axis and exiting the light redirecting member, a curved intersection of the curved reflective surface and a first plane formed by the input and redirected axes having a radius of curvature, the curved reflective surface having an axis of revolution disposed in the first plane, wherein the output light makes an angle, $\Theta$, with respect to a normal to the output surface, such that substantially all light reflected by the output surface and refocused by the curved reflective surface falls outside a core of the waveguide.

Item 43. The light coupling unit of item 42, wherein the redirected axis is angled with respect to the output surface normal such that about 80 percent of light reflected by the output surface and focused by the curved reflective surface falls outside a core of the waveguide.

Item 44. The light coupling unit of item 42, wherein the redirected axis is angled with respect to the output surface normal such that about 85 percent of light reflected by the output surface and focused by the curved reflective surface falls outside a core of the waveguide.

Item 45. The light coupling unit of item 42, wherein the redirected axis is angled with respect to the output surface normal such that about 90 percent of light reflected by the output surface and focused by the curved reflective surface falls outside a core of the waveguide.

Item 46. The light coupling unit of any of items 42 through 45, wherein $\Theta > 2.5$ degrees.

Item 47. The light coupling unit of any of items 42 through 46, wherein the redirected axis makes an angle, $\Theta > D/2f$, with respect to the output surface normal, wherein D is a diameter of a core the waveguide and f is a focal length of the curved reflective surface.

Item 48. The light coupling unit of item 47, wherein redirected light that is reflected by the output surface is focused by the curved reflective surface to a point that is a distance, s, from a center of a core of the waveguide, wherein $s = 2f\Theta$.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A light coupling unit for use in an optical connector, comprising:

a waveguide alignment member configured to receive and align at least one optical waveguide; and a light redirecting member, comprising:

an input surface configured to receive input light from an end face of the optical waveguide;

a curved reflective surface configured to receive light from the input surface propagating along an input axis and to reflect the light received from the input surface, the reflected light propagating along a different redirected axis; and an output surface configured to receive light from the curved reflective surface and to transmit the light received by the output surface as output light propagating along an output axis and exiting the light redirecting member, a curved intersection of the curved reflective surface and a first plane formed by the input and redirected axes having a radius of curvature, the curved reflective surface having an axis of revolution disposed in the first plane, wherein the input surface is angled with respect to an axis of the optical waveguide such that substantially none of the input light that is reflected by the input surface is coupled into the waveguide.

2. The light coupling unit of claim 1, wherein the input surface is angled with respect to an axis of the optical waveguide such that input light that is reflected by the input surface is reflected an angle, $\Phi$, wherein $\Phi$ is greater than a numerical aperture, $\Theta_{NA}$, of the optical waveguide and $\Phi$ is greater than 9 degrees.

3. The light coupling unit of claim 1, wherein the input surface is angled with respect to an axis of the optical waveguide such that less than about 20% of input light that is reflected by the input surface is coupled back into the optical waveguide.

4. The light coupling unit of claim 1, wherein the input surface is angled with respect to an axis of the optical waveguide such that less than about 5% of input light that is reflected by the input surface is coupled back into the optical waveguide.

5. The light coupling unit of claim 1, wherein the input surface is angled with respect to an axis of the optical waveguide such that less than about 1% of input light that is reflected by the input surface is coupled back into the optical waveguide.

6. The light coupling unit of claim 1, wherein the axis of revolution forms a first angle with the redirected axis, the first angle being non zero.

7. The light coupling unit of claim 1, wherein the waveguide alignment member is configured such that the end face of the optical waveguide is positioned at a location that is not a geometric focus of the curved reflective surface.

8. The light coupling unit of claim 1, wherein the output light makes an angle, $\Theta$, with respect to a normal to the output surface, such that substantially all light reflected by the output surface and re-focused by the curved reflective surface falls outside a core of the optical waveguide.

9. The light coupling unit of claim 1, wherein the radius of curvature, R, is:

$$R = \frac{2f}{\tan\left(\frac{\pi-\phi}{2}\right)}\sqrt{\tan\left(\frac{\pi-\phi}{2}\right)^2 + 1},$$

wherein ø is an angle between the input axis and the redirected axes.

10. The light coupling unit of claim 9, wherein the output surface is disposed at one focal length measured along the redirected axis from the curved reflective surface.

* * * * *